United States Patent [19]
Bergervoet et al.

[11] Patent Number: 5,996,405
[45] Date of Patent: Dec. 7, 1999

[54] MEASURING DEVICE PROVIDED WITH ROTARY PISTONS

[75] Inventors: Josephus T. M. Bergervoet, Terborg, Netherlands; Harmen H. Dijstelbergen, Essen, Belgium

[73] Assignee: Instromet B.V., Netherlands

[21] Appl. No.: 08/977,958

[22] Filed: Nov. 25, 1997

[30] Foreign Application Priority Data

Dec. 12, 1996 [NL] Netherlands ............... 1004751

[51] Int. Cl.$^6$ ............... G01F 3/04; G01F 5/00
[52] U.S. Cl. ............... 73/261; 73/202
[58] Field of Search ............... 73/261, 196, 197, 73/198, 202, 203, 235, 236, 237, 239, 240

[56] References Cited

U.S. PATENT DOCUMENTS

| | | |
|---|---|---|
| 3,748,903 | 7/1973 | Irie et al. . |
| 4,612,804 | 9/1986 | Colonnello ............... 73/261 |
| 4,916,949 | 4/1990 | Lofink ............... 73/261 |
| 5,090,240 | 2/1992 | Baker et al. ............... 76/203 |
| 5,150,612 | 9/1992 | Lew ............... 73/261 |

FOREIGN PATENT DOCUMENTS 31 05 890 A1 of 0000 Germany .
819579 of 0000 Germany .

OTHER PUBLICATIONS

F. Herning: "Gedanken Zue Moglichen Weiterentwickklung Hochdruckgasmessung Aus Der Sict Der Ferngasversorgung", Feb. 17, 1967, pp. 157–162.

Primary Examiner—Harshad Patel
Assistant Examiner—Robin Clark
Attorney, Agent, or Firm—Brooks & Kushman P.C.

[57] ABSTRACT

Measuring device for measuring the flow rate of a gas flow or liquid flow by means of a rotary piston device consisting of two rotary pistons which are placed in a pipe section and are mounted in such a way that they rotate about a rotary shaft, which rotary pistons are placed relative to each other and relative to the pipe section in such a way that by interaction with each other they shut off the pipe section. During the rotation the two rotary pistons always remain in contact with the wall of the pipe section at one side and with each other at the other side, a quantity of gas or liquid being allowed through every turn. The measuring device is characterized in that it consists of a number of parallel branches, with a rotary piston device accommodated in each branch, the rotary piston devices being synchronized with each other by means of synchronization means in such a way that the flow rate is approximately constant.

12 Claims, 5 Drawing Sheets

MEASURING DEVICE PROVIDED WITH ROTARY PISTONS

The invention relates to a measuring device for measuring a gas flow or liquid flow by means of a rotary piston device consisting of two rotary pistons which are placed in a pipe section and are mounted in such a way that they rotate about a rotary shaft, which rotary pistons are placed relative to each other and relative to the pipe section in such a way that by interaction with each other they shut off the pipe section, which two rotary pistons can be rotated in opposite directions, the two rotary pistons with a certain play always remaining in contact with the wall of the pipe section at one side and with each other at the other side, so that at every turn during the rotation the rotary pistons by interaction with the wall of the pipe section separate off a quantity of gas or liquid from the one side of the pipe section and transport it to the other side of the pipe section.

Such measuring devices are known. The known rotary piston meters comprise two rotors engaging with each other and having, for example, a substantially 8-shaped cross-section. The rotary pistons or rotors are synchronized by means of gear wheels.

A disadvantage of the known rotary piston meters is that at a uniform speed of rotation of the rotary pistons the flow and the pressure pulsate at a frequency which is equal to four times the speed of revolution of the rotary pistons. These pulsations can be a nuisance on account of the noise which they produce. Moreover, as a result of these pressure pulsations, rotary piston meters are not suitable for calibrating other meters, although the high degree of stability of rotary piston meters would make these meters attractive for use as reference meters.

The object of the invention is a measuring device for measuring a gas flow, in which the pulsations of pressure and flow are greatly reduced.

The object of the invention is achieved by the fact that the measuring device consists of a number of parallel branches that provide the sole connection between upstream and downstream pipe sections, with a rotary piston device accommodated in each branch, the rotary piston devices being synchronized by means of synchronization means in such a way that in each branch the rotary pistons of the corresponding rotary piston device are always situated at an angle to the rotary pistons of a rotary piston device in an adjacent branch, which angle, measured in the direction of rotation or counter to the direction of rotation of the rotary pistons, is substantially equal to approximately 90 degrees divided by the number of branches. These measures ensure that the various rotary piston devices are in phase opposition to each other and that the pulsations caused by the various rotary piston devices largely cancel each other out.

In a preferred embodiment of the invention, the measuring device consists of a pipe section which divides into two parallel branches, which branches subsequently converge again in a single pipe section, a first branch having accommodated therein a first rotary piston device which is identical to a second rotary piston device accommodated in the second, parallel branch, and the first and the second rotary piston devices being synchronized by means of synchronization means in such a way that the rotary pistons of the first rotary piston device are always situated at an angle to the rotary pistons of the second rotary piston device, which angle lies between 35 degrees and 55 degrees. This means that with a minimum number of rotary piston devices it is already ensured that the pulsations are in phase opposition and largely damp each other out. This effect is greatest if the angle is 45 (or 135) degrees, but it has been found that a tolerance of 5 degrees—which means that the angle lies between 40 and 50 degrees or between 130 and 140 degrees—is permissible for obtaining a reduction of the pulsations which is acceptable for most applications. It is immaterial here whether the first rotary piston device is 45 degrees behind or ahead of the second rotary piston device.

In a further preferred embodiment of the invention, the rotary shafts of the rotary pistons of the first rotary piston device run parallel next to the rotary shafts of the rotary pistons of the second rotary piston device. This embodiment can be achieved in a simple manner. The synchronization means in this case preferably consist of a first gear wheel which is rotatable about the rotary shaft of a rotary piston of the first rotary piston device, and a second gear wheel which is rotatable about the rotary shaft of a rotary piston of the second rotary piston device, the first gear wheel being brought into mesh with the second gear wheel. A minimum number of gear wheels is used here, so that the friction is as low as possible. However, it is also possible to use one or more intermediate gear wheels for coupling the first gear wheel and the second gear wheel to each other, in which case the first and the second gear wheel rotate in the same direction. In another preferred embodiment, the first and the second gear wheel can be coupled to each other by means of a chain or toothed belt which is preferably a metal belt with beads, so that the friction is limited as much as possible.

In another preferred embodiment of a measuring device according to the invention, the rotary shafts of the rotary pistons of the first rotary piston device run in line with the rotary shafts of the rotary pistons of the second rotary piston device. This design makes it possible to ensure that the friction inevitably introduced by the synchronization means is kept as low as possible. A pair of the rotary shafts of the rotary pistons is interconnected here by means of a coupling which can be made of, for example, a rubber connecting part. Such a rubber coupling gives a certain degree of flexibility which can compensate for imperfections in the alignment of the rotary piston devices. Another advantageous possibility is a coupling consisting of two half ground-down shafts or a driver. These possibilities have the advantage that the energy loss as a result of damping is minimal, while the play can be kept low.

In another preferred embodiment of the invention, the synchronization means consist of a narrowing in the pipe section in which the branches converge, the flow resistance of the narrowing being greater, for example two or more times so, than the flow resistance of the rotary pistons. This narrowing can be made in the pipe section situated upstream, in which the branches converge, but it can also be made in the pipe section situated downstream, or in both. This means that the coupling between the two rotary piston devices is obtained pneumatically. The connection between the two rotary pistons is kept as short as possible here. The gas flow becomes constant in the first instance by this measure, while the rotary piston devices are forced to synchronize as well as possible in phase opposition.

In a further preferred embodiment, on either side of the rotary piston devices the branches in which the rotary piston devices are placed open out into a pressure vessel. The advantage of this is that the two rotary piston devices are coupled very directly at only a very short distance from each other, and that a very compact construction is obtained.

The invention will be explained in greater detail with reference to the drawing, in which.

Figure 1:
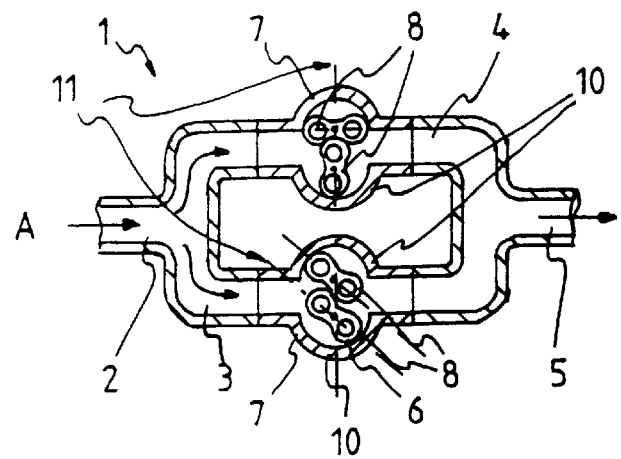
FIG. 1 shows in cross-section a measuring device according to the invention.

FIG. 1 shows in cross-section a measuring device 1 according to the invention, through which a gas flows in the direction of the arrow A. The measuring device 1 comprises a pipe section 2 which divides into two parallel branches 3, 4. Said branches 3, 4 subsequently converge again downstream in a pipe section 5 and provide the sole connection between the pipe sections 3 and 5. The branch 3 accommodates a rotary piston device 6 in an oval-shaped widening 7 of the branch 3. An identical oval-shaped widening 7 is present in the branch 4, in which widening an identical rotary piston device 6 is placed. The rotary piston device 6 consists of two rotary pistons or rotors 8 which have a substantially 8-shaped cross-section. The rotary pistons 8 each rotate about a shaft 9 which runs at right angles to the direction of flow and is situated in line with the wall of the branch 3, 4. The oval-shaped widening comprises two semi-cylindrical walls 10 which are situated opposite each other and the radius of which corresponds to the distance between the rotary shafts 9 of the rotary pistons 8. This means that in any position the rotary pistons 8 fully shut off the passage by interaction with the semi-cylindrical walls 10, leaving a certain play. During rotation of the rotary pistons, the latter always separate off a quantity of gas, which on continued rotation of the pistons is released again at the other side of the rotary piston device. The axes of symmetry 11 of the rotary pistons 8 of the rotary piston device 6 in branch 3 are situated at an angle of approx. 45 degrees, with a play of approx. +/−5 degrees, to the axes of symmetry 11 of the rotary pistons 8 of the rotary piston device 6 in branch 4. The rotary pistons 8 in the branch 4 thus always run approximately 45 degrees ahead of the rotary pistons 8 of the branch 3. However, it is equally possible for the rotary pistons 8 in the branch 4 always to run approximately 135 degrees ahead of the rotary pistons 8 of the branch 3, which amounts to the rotary pistons 8 in the branch 3 running approximately 45 degrees ahead of the rotary pistons 8 of the branch 4, and is thus essentially the same. Whenever the one rotary piston device 6 dispenses a quantity of gas to the pipe section situated downstream, the other rotary piston device dispenses nothing. The two rotary pistons are thus in phase opposition, in which case the pulsations in pressure and flow in the pipe section placed downstream largely cancel each other out.

Figure 2:
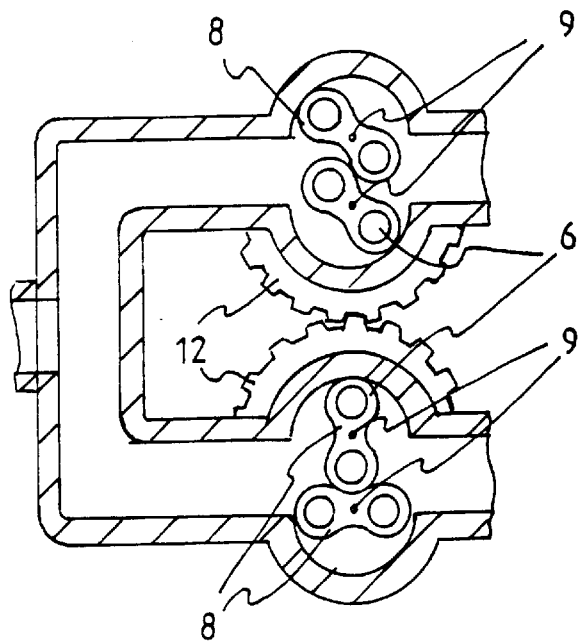
FIG. 2 shows in side view a measuring device according to FIG. 1, provided with synchronization means.
Figure 3:
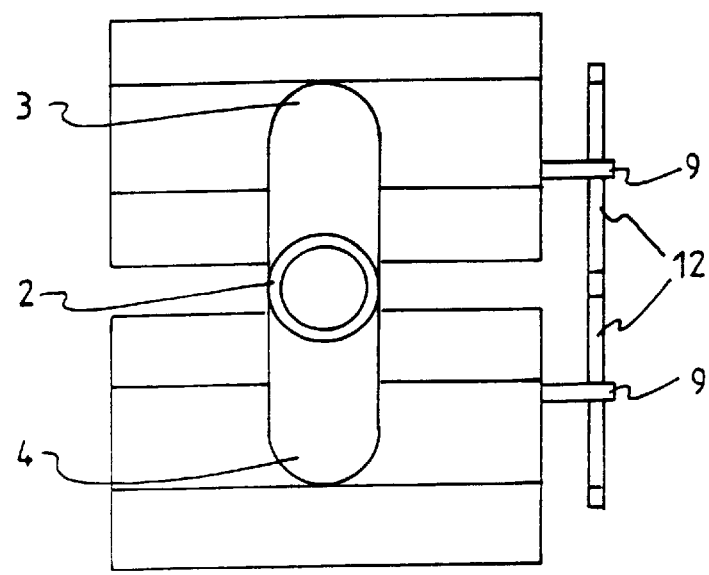
FIG. 3 shows in top view the measuring device according to FIG. 2.

In order to ensure that the two rotary piston devices 6 are always in phase opposition to each other, the two rotary piston devices 6 must be synchronized. FIG. 2 shows in cross-section a measuring device 1, in which the synchronization means consist of two meshing gear wheels 12. The same measuring device 1 is shown in side view in FIG. 3. A first gear wheel 12 is fixed on the end of a rotary shaft 9 of a rotary piston 8 in the branch 3, while the second gear wheel is fixed on the end of the rotary shaft 9 of a rotary piston 8 in the branch 4.

Figure 5:
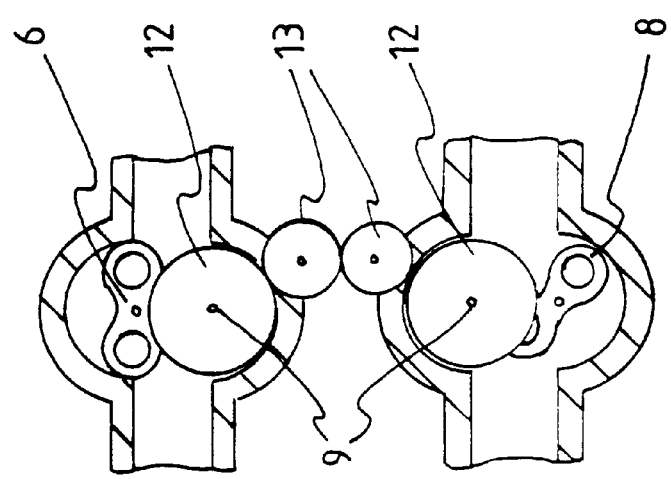
FIG. 5 shows diagrammatically in side view a third possible measuring device.
Figure 4:
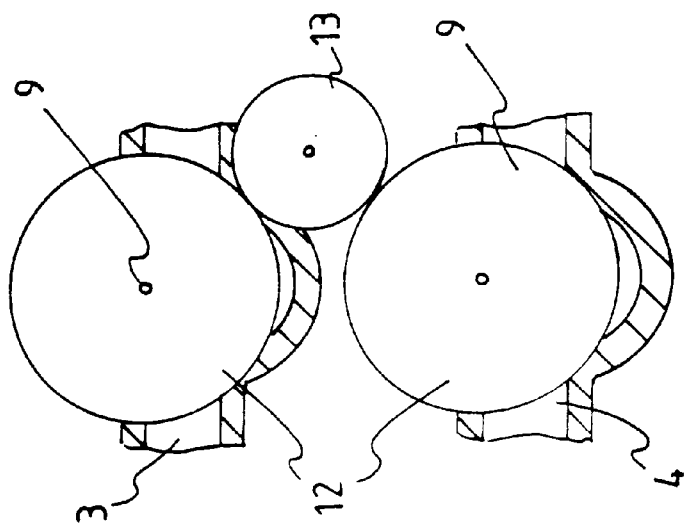
FIG. 4 shows diagrammatically in side view a second possible measuring device according to the invention.

Other possibilities are shown diagrammatically in FIGS. 4 and 5, in which the coupling between the gear wheels 12 at the ends of the rotary shafts 9 is produced by means of one and two intermediate gear wheels 13 respectively.

Figure 6:
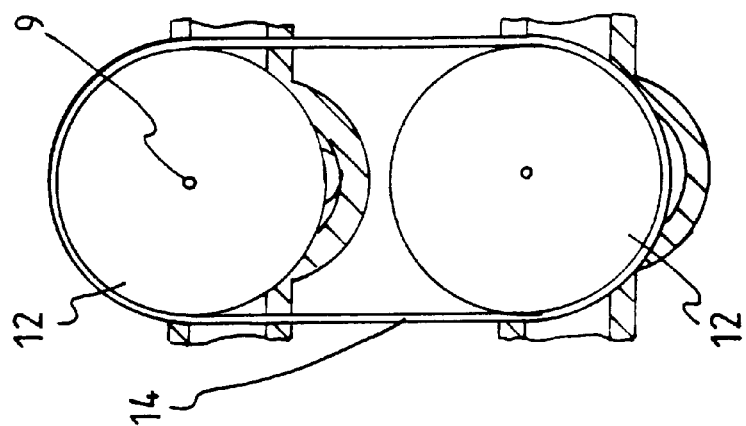
FIG. 6 shows diagrammatically in side view a fourth possible measuring device.

FIG. 6 shows a measuring device 1 with another possible embodiment of the synchronization means, in which the gear wheels 12 are interconnected by means of a toothed belt 14.

Figure 8:
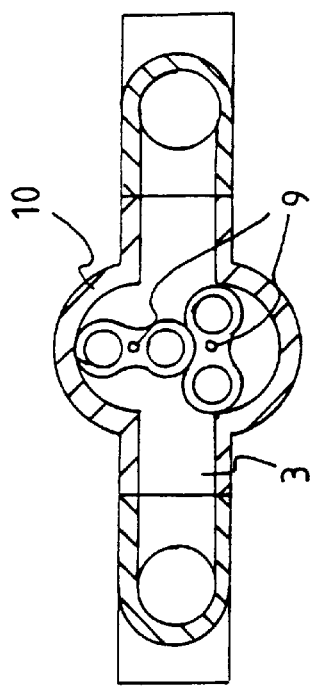
FIG. 8 shows a cross-section along the line VIII—VIII according to FIG. 7.
Figure 9:
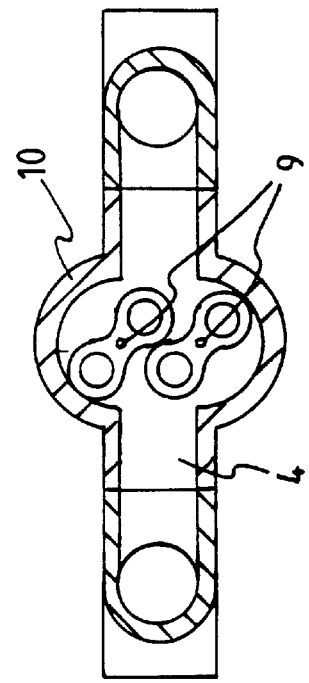
FIG. 9 shows a cross-section along the line IX—IX according to FIG. 7.

In the case of the measuring devices from FIGS. 1 to 6 the rotary shafts 9 of the rotary pistons 8 are always situated at a distance from, parallel to and next to each other. However, as shown in FIGS. 7, 8 and 9, it is also possible to place the rotary piston devices 6 in the branches 3 and 4 in such a way that the rotary shafts 9 lie in line with each other.

Figure 7:
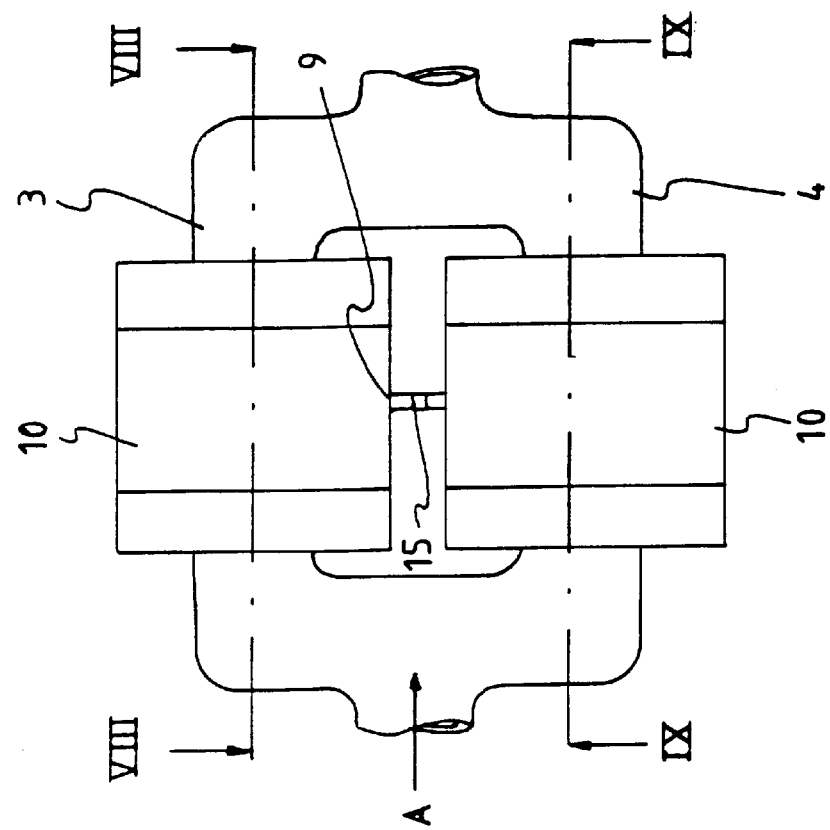
FIG. 7 shows diagrammatically in top view a fifth possible measuring device.

FIG. 7 shows this measuring device in top view. FIG. 8 shows a cross-section along the line VIII—VIII, while FIG. 9 shows a cross-section along the line IX—IX from FIG. 7. In the case of this embodiment, the rotary shafts 9 of the rotary pistons are situated substantially at right angles to the lengthwise direction of the branches 3, 4. The rotary shaft 9 is connected to the rotary shaft 9 lying in line therewith by means of a flexible coupling 15, consisting of a rubber connecting part. The flexible coupling 15 compensates for inaccuracies in the alignment of the rotary shafts 9 with each other. Another possible flexible coupling can consist of, for example, the rotary shafts 9 which are in line with each other being ground down to a semi-cylindrical shape at the ends facing each other, so that the two ends can drive each other.

Figure 10:
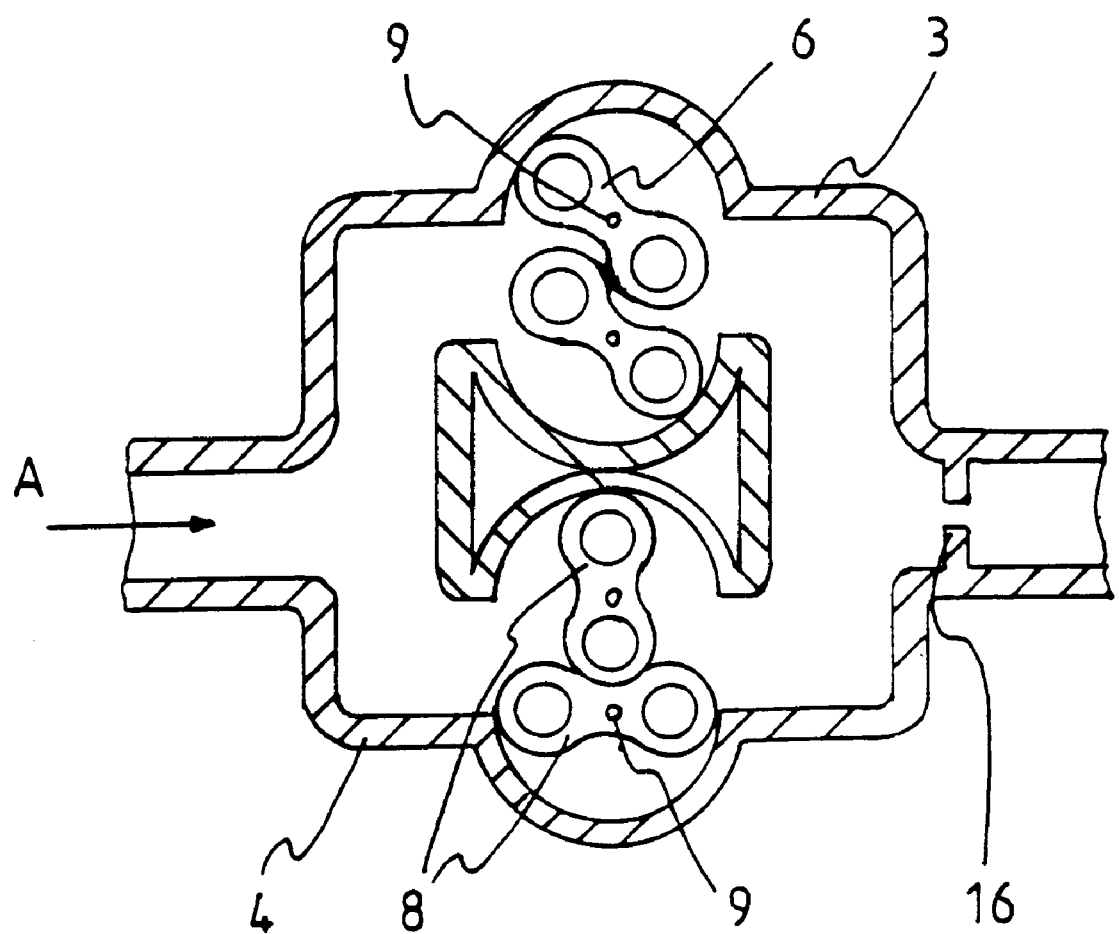
FIG. 10 shows in cross-section a possible embodiment of a measuring device according to the invention.

FIG. 10 shows a measuring device in which the synchronization means consist of a narrowing or restriction 16 which is made in the pipe section situated downstream. There is no mechanical synchronization between the two rotary piston devices 6. The flow resistance of the restriction is several times, for example two or three times, that of the resistance of the rotary piston devices 6. This means that the gas flow before the narrowing 16 is virtually constant, so that the rotary piston devices 6 are forced to synchronize as well as possible in phase opposition.

Figure 11:
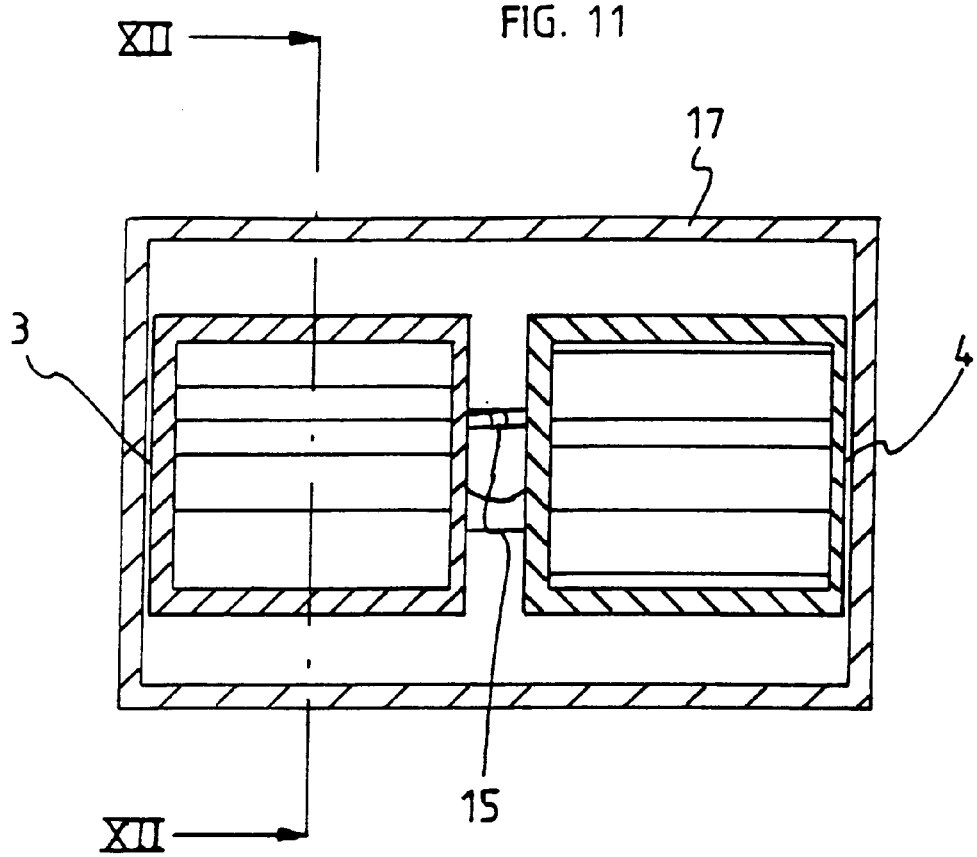
FIG. 11 shows in cross-section a possible embodiment of a measuring device according to the invention.
Figure 12:
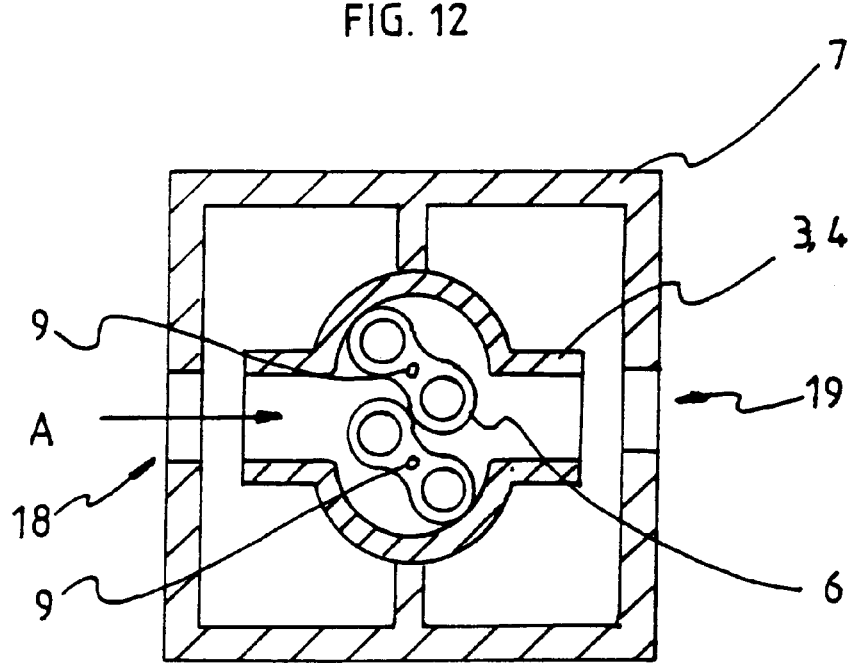
FIG. 12 shows a longitudinal section along the line XII—XII according to FIG. 11.

FIG. 11 shows in cross-section a measuring device according to the invention which is placed in a pressure vessel 17. The same measuring device is shown in FIG. 12 in longitudinal section. This design has the advantage that the measuring device is relieved of pressure, while mechanical stresses on the connected pipework cannot have an effect on the measuring device. On either side of the rotary piston devices 6 the branches 3 and 4 both open out into the interior of the pressure vessel 17, in which an excess pressure equal to the pressure of the gas in the gas flow prevails. The rotary shafts of the rotary pistons 8 lie in line with each other and are coupled by means of a coupling 15. The pressure vessel 17 is provided with a supply aperture 18, to which a supply line for gas is connected, and a discharge aperture 19, to which a discharge line is connected.

We claim:

1. Measuring device for directly measuring a gas flow or liquid flow through a pipe by means of a rotary piston device consisting of two rotary pistons which are placed in said pipe and are mounted in such a way that they rotate about a rotary shaft, which rotary pistons are placed relative to each other and relative to the pipe in such a way that by interaction with each other they shut off the pipe, which two rotary pistons can be rotated in opposite directions, the two rotary pistons with a certain play always remaining in contact with the wall of the pipe at one side and with each other at the other side, so that during the rotation the rotary pistons by interaction with the wall of the pipe always separate off a quantity of gas or liquid from the one side of the pipe and continue rotating to the other side of the pipe, characterized in that said pipe having a first pipe section and a second pipe section, the measuring device including a number of parallel branches that provide the sole connection of the first pipe section to the second pipe section, a rotary piston device being accommodated in each branch, a synchronizer for the rotary piston devices such that in each branch the rotary pistons of the corresponding rotary piston device are always situated at an angle to the rotary pistons of a rotary piston device in an adjacent branch, which angle, measured in the direction of rotation or counter to the direction of rotation of the rotary pistons, is substantially equal to approximately 90 degrees divided by the number of branches.

2. Measuring device according to claim 1, characterized in that the measuring device consists of two parallel branches, a first branch having accommodated therein a first rotary piston device which is identical to a second rotary piston device accommodated in the second, parallel branch, and the first and the second rotary piston devices being synchronized by means of synchronization means in such a way that the rotary pistons of the first rotary piston device are always situated at an angle to the rotary pistons of the second rotary piston device, which angle lies between 35 degrees and 55 degrees.

3. Measuring device according to claim 1 or 2, characterized in that the rotary shafts of the rotary pistons of the first rotary piston device run parallel next to the rotary shafts of the rotary pistons of the second rotary piston device.

4. Measuring device according to claim 1 or 2, characterized in that the rotary shafts of the rotary pistons of the first rotary piston device run in line with the rotary shafts of the rotary pistons of the-second rotary piston device.

5. Measuring device according to claim 1 or 2, characterized in that the synchronization means consist of a narrowing in the pipe section in which the branches converge, the flow resistance of the narrowing being greater, for example two or more times so, than the flow resistance of the rotary pistons.

6. Measuring device according to claim 3, characterized in that the synchronization means consist of a first gear wheel which is rotatable about the rotary shaft of a rotary piston of the first rotary piston device, and a second gear wheel which is rotatable about the rotary shaft of a rotary piston of the second rotary piston device, the first gear wheel being brought into mesh with the second gear wheel.

7. Measuring device according to claim 3, characterized in that the synchronization means consist of a first gear wheel which is rotatable about the rotary shaft of a rotary piston of the first rotary piston device, and a second gear wheel which is rotatable about the rotary shaft of a rotary piston of the second rotary piston device, one or more intermediate gear wheels coupling the first gear wheel and the second gear wheel to each other.

8. Measuring device according to claim 3, characterized in that the synchronization means consist of a first wheel which is rotatable about the rotary shaft of a rotary piston of the first rotary piston device, and a second wheel which is rotatable about the rotary shaft of a rotary piston of the second rotary piston device, a chain or toothed belt coupling the first wheel and the second wheel to each other.

9. Measuring device according to claim 8, characterized in that the belt is a metal belt with beads.

10. Measuring device according to claim 1 or 2, characterized in that the rotary pistons of the first rotary piston device are always situated at an angle to the rotary pistons of the second rotary piston device, which angle lies between 40 degrees and 50 degrees.

11. Measuring device according to claim 10, characterized in that the angle is approx. 45 degrees.

12. Measuring device according to claim 1 or 2, characterized in that on either side of the rotary piston devices the branches in which the rotary piston devices are placed open out into a pressure vessel.

\* \* \* \* \*

UNITED STATES PATENT AND TRADEMARK OFFICE
CERTIFICATE OF CORRECTION

PATENT NO : 5,996,405
DATED : December 7, 1999
INVENTOR(S) : Joseph T. M. Bergervoet; Harmen H. Dijstelbergen It is certified that error appears in the above-identified patent and that said Letters Patent is hereby corrected as shown below:

Column 5, line 41, after "the" and before "second", delete "-".

Signed and Sealed this

Twenty-seventh Day of June, 2000

Attest:

Q. TODD DICKINSON

Attesting Officer

Director of Patents and Trademarks